United States Patent [19]

Kieser

[11] Patent Number: 4,860,902
[45] Date of Patent: Aug. 29, 1989

[54] SEALING OF CONTAINER CLOSURE

[75] Inventor: Wolfgang Kieser, Hohenhöllen, Fed. Rep. of Germany

[73] Assignee: Elopak A/S, Lierstrada, Norway

[21] Appl. No.: 231,603

[22] Filed: Aug. 11, 1988

Related U.S. Application Data

[63] Continuation of Ser. No. 918,010, Oct. 10, 1986, abandoned.

[30] Foreign Application Priority Data

Oct. 10, 1985 [GB] United Kingdom ............... 8525028

[51] Int. Cl.⁴ .............................................. B65D 5/74
[52] U.S. Cl. ................... 206/631.3; 53/373; 53/477; 53/DIG. 2; 229/125.42; 493/133; 493/184
[58] Field of Search ............... 493/133–135, 493/184; 53/373, 375, DIG. 2, 477; 229/17 R, 17 G, 7 R, 137, 138

[56] References Cited

U.S. PATENT DOCUMENTS 3,116,002 12/1963 Crawford et al. ............... 229/17 G
3,322,324 5/1967 Persson ............................ 229/137
3,555,975 1/1971 Barnes ............................. 53/375
3,956,975 5/1976 Egleston et al. .................. 53/375
4,206,867 6/1980 Skjelby .......................... 229/17 G
4,251,303 2/1981 Deimel et al. .................... 493/184
4,403,465 9/1983 Bachner ......................... 53/477

FOREIGN PATENT DOCUMENTS 65846 1/1982 European Pat. Off. ........... 493/184

Primary Examiner—Gary Elkins
Attorney, Agent, or Firm—Pravel, Gambrell, Hewitt, Kimball & Krieger

[57] ABSTRACT

A spouted, gable-topped carton has its top closure fin sealed by welding employing an ultrasonic horn and an anvil giving a suitable profile of contour sealing of the fin. There is a straight continuous lengthwise seal where the fin is two-ply and a meandering continuous lengthwise seal where it is four-ply, whilst the sealed portions of the four-ply spout part of the fin are of lesser total extent in proportion to the area of that spout part than are the sealed portions of the other four-ply part of the fin in proportion to its area.

12 Claims, 1 Drawing Sheet

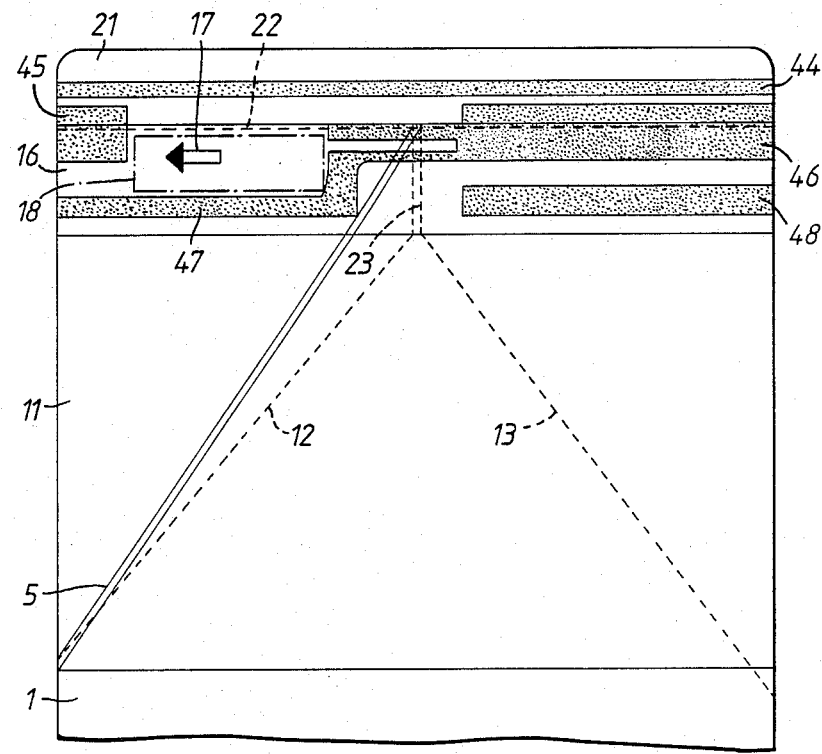

SEALING OF CONTAINER CLOSURE

This is a continuation of application Ser. No. 918,010, filed 10/10/86, now abandoned.

BACKGROUND OF THE INVENTION

1. Field of the Invention

This invention relates to the sealing of container closures, particularly of those closures intended to be opened by the users.

2. Description of the Prior Art

Spouted, gable-topped or flat-topped cartons made from paperboard coated on both faces with thermoplastics are conventional. It is well known to seal the top and bottom closures thereof, of which the top incorporates an openable spout, by means of heating thermoplastic surface portions with hot air to a tacky consistency and then, by use of a pair of jaws, pressing the tacky portions together while they cool, thereby to form a fin. However, with the fin including part of the spout, there is a conflict between the need to ensure that the fin is liquid-tight and thus well-sealed and the consumer requirement that the spout should be easy to open. As a step towards the resolution of this conflict, it is also well known to provide abhesive substance over selected face-to-face surface portions of the fin at the spout to deter sealing, to facilitate opening of the spout.

Such hot air heating tends to be non-uniform and inaccurate and involves two process stations. It is known from U.S. Pat. No. 3,309,841 and European patent specification No. 0028941A to use nozzles in the form of lines of perforations or slots to direct the hot air towards those surface portions to be rendered tacky in order to try to minimize heating of those surface portions which are not to be sealed together, particularly of selected surface portions of the spout. In the disclosure of the European patent specification, the jaws are provided with respective shallow elongate recess to relieve the pressure of the jaws on abhesive-coated surface portions of the spout at the fin. However, even this system still suffers from inaccuracy and non-uniformity, resulting in poor sealing at the fin and/or difficulty of opening of the spout.

For these reasons ultrasonic welding employing an ultrasonic horn and an anvil has increasingly been used recently; it can be both accurate and uniform.

U.S. Pat. No. 3,912,576 discloses carton sealing apparatus for sealing a rectangular bottom closure of a thermoplastic coated paperboard carton by ultrasonic vibrations. The apparatus includes an anvil and an ultrasonic vibrating tool. The mandrel is received in the carton with the closure to be sealed folded against the smooth end surface thereof. The ultrasonic vibrating tool engages the closure on the opposite side thereof from the mandrel and, then energized, generates heat sufficient to cause the thermoplastic coating of the paperboard to flow and weld the layers of the closure together. Ribs project from the end surface of the vibrating tool to provide a sealing pattern of "bow-tie" configuration, the ribs having various heights with respect to the end surface of the vibrating tool to accommodate changes in the number of layers of paperboard at the different areas on the closure. Somewhat similar apparatus are disclosed in U.S. Pat. Nos. 3,971,300 and 4,011,800.

U.S. Pat. No. 3,956,975 discloses a method and an apparatus for making a spouted gable-topped carton from a flat blank, in which a corner seam of the carton, the flat bottom closure and the gable-top closure are sealed at separate stations all by means of ultrasonic welding. The sealing of the fin of the gable-top closure is performed by a retractable, concentrating vibrating horn to one side of the path of advance of the filled carton and a retractable anvil to the opposite side of the path. To cope with a change in the fin from an upper two-ply part to a lower four-ply part, either of two alternative constructions of ultrasonic welding device are employed. In the first, the anvil is a single piece anvil having a configuration to accommodate the changing contour from two-ply to four-ply at its side of the fin and the horn is a single piece horn having a configuration to accommodate the changing contour from two-ply to four-ply at its side of the fin. In the second a separate horn and anvil are utilized to weld the two-ply part and a separate horn and anvil are utilized to weld the four-ply part. In both cases, the welding extends as bands of constant width from one end of the fin to the other.

Unfortunately, with this welding arragement, the spout is difficult to open if the fin is well sealed. Somewhat similar apparatus are disclosed in U.S. Pat. Nos. 4,072,089 and 4,159,220.

SUMMARY OF THE INVENTION

According to a first aspect of the present invention there is provided a method of sealing a container closure comprising a first zone not intended to be opened by a consumer of contents of the container and a second zone intended to be opened by said consumer, comprising rendering tacky by ultrasonic heating surface portions of said first zone which portions are in face-to-face contact with each other, and rendering tacky by ultrasonic heating surface portions of said second zone, which latter surface portions are in face-to-face contact with each other but are of lesser extent in proportion to the area of said second zone that are the said surface portions of said first zone.

According to a second aspect of the present invention, there is provided a container comprising a closure comprised of a first zone not intended to be opened by a consumer of contents of said container and including surface portions sealed together by a method comprising ultrasonic heating, and a second zone intended to be opened by said consumer and including surface portions sealed together by a method comprising ultrasonic heating, the latter surface portions being of lesser extent in proportion to the area of said second zone than are the said surface portions of said first zone.

Owing to the present invention, it is possible to obtain reliable sealing of the closure, whilst nevertheless providing for easy opening of the second zone of the closure.

BRIEF DESCRIPTION OF THE DRAWING

In order that the invention may be clearly understood and readily carried into effect, reference will now be made, by way of example, to the accompanying drawing, which shows a side elevation of a spouted, gable-topped carton having its top closure ultrasonically sealed.

DESCRIPTION OF THE PREFERRED EMBODIMENT

The carton has been made from a blank according to FIG. 1 of U.S. Pat. No. 3,956,975, for example, and, prior to filling and top-sealing, was of the form shown in FIG. 2 of the Patent, for example. Referring to the present drawing, the carton is of a conventional construction, made of paperboard coated on both surfaces with plastics, and including a loop of four main sub-panels (of which one is seen and referenced 1), a loop of four top closure obdurating sub-panels (of which three are seen and referenced 11 to 13), and a loop of four top closure sealing subpanels (of which three are seen and referenced 21 to 23) sealed together to provide a sealing fin 16, with the fin being tearingly openable from its end indicated by a printed or embossed arrow 17 to enable the folded-in sub-panels 12 and 22 to be folded out to form a pouring spout delimited by two symmetrical, oblique, scored fold lines (of which one is seen and referenced 5) and with rectangular internal surface layers 18 of abhesive, for example silicone, to discourage excessive sealing of the sealing sub-panel 22 to the sub-panel 21 and the unreferenced sealing sub-panel and thus facilitate folding-out of the spout.

The drawing illustrates an example of a suitable profile of contour sealing of the fine 16 using ultrasonic welding employing an ultrasonic horn and an anvil. It will be noted that the profile of contour sealing includes a straight continuous seal 44 between the sealing sub-panel 21 and the unreferenced sealing sub-panel over the length of the two-ply upper part of the sealing fin 16. A small block 45 of sealing is applied over the top zone of the ends of the sub-panel 22 and the adjacent parts of the sub-panel 21 and the unreferenced sealing sub-panel, such block extending above the top edge of the sub-panel. There is a corresponding, but much larger, block 46 over the top zone of the sub-panel 23, the block 46 being part of band 47 extending to the spout end of the sealing fin, so that there is a meandering, continuous seal 47 running through the mainly four-ply lower part of the fin 16. The band 47 varies in width, being generally wider at the block 46 than over the spout half of the fin 16. Finally, the sealing profile includes a block 48 immediately below the block 46. It can be seen from the present drawing that the sealing areas of the spout half of the fin cover a smaller percentage of the spout half than the percentage of the non-spout half of the fin which is covered by the sealing areas of the non-spout half. The working face of the horn is formed with protrusions corresponding to the areas 44 to 48 to be sealed, and the working face of the anvil may also be formed with protrusions corresponding to those areas. No such protrusions are provided opposite the abhesive layers 18, although the seals 45, 46 and 47 closely approach the layers 18. The ultrasonic welding apparatus employed may be of the kind disclosed in FIG. 11 of the U.S. Pat. No. 3,956,976, for example.

The present selective sealing of the fin 16 ultrasonically has the advantages of providing a high-quality, accurate seal over the zones of the fin where leakage is most likely to occur and yet of enabling the spout 12, 22 to be folded out relatively cleanly and easily.

I claim:

1. A container in the form of a carton, comprising a closure comprised of a first zone not intended to be opened by a consumer of contents of said carton and including surface portions sealed together by a method comprising ultrasonic heating and a second zone intended to be opened by the consumer and including surface portions sealed together by a method comprising ultrasonic heating, said surface portions of said first zone and said surface portions of said second zone including surface portions separated from each other by substantially unsealed portions, said closure being an end closure of said carton including a sealing fin which extends from one one side of said closure to an opposite side thereof and which comprises a mainly four-ply part extending from said one side to said opposite side and including a spout part at said second zone, said surface portions of said first zone and said surface portions of said second zone comprising a meandering band of surface portions included in said mainly four-ply part and extending continuously in said mainly four-ply part the length of said mainly four-ply part.

2. A container according to claim 1, wherein said band varies in width, being generally wider at said first zone than at said second zone.

3. A container according to claim 1, wherein said fin includes a two-ply part extending from said one side to said opposite side and situated immediately outwardly of said mainly four-ply part, said band, at said first zone, overlapping said two-ply part.

4. A container according to claim 3, wherein said surface portions of said second zone include a separate block of surface portions at an end of said fin, said block overlapping said two-ply part at said end of said fin, said block being separated from said band by substantially unsealed surface portions.

5. A container according to claim 3, wherein said two-ply part comprises surface portions sealed together by a method comprising ultrasonic heating along a second band separate from the first-mentioned band and extending from said one side to said opposite side, said second band being separated from the first-mentioned band by substantially unsealed surface portions.

6. A container according to claim 1, wherein said surface portions of said first zone include a separate block of surface portions situated inwards of said band, said block being separated from said band by substantially unsealed surface portions.

7. A method of sealing a carton end closure having a mainly four-ply sealing fin part extending across the carton, and having a first zone not intended to be opened by a consumer of the contents of the carton and a second zone intended to be opened by the consumer, with a spout part at said second zone, comprising rendering tacky by ultrasonic heating a meandering band of surface portions of said first zone, which portions are in face-to-face contact with each other, and of surface portions of said second zone, which latter surface portions are in face-to-face contact with each other, all of which surface portions are included in said fin part and extend continuously in said four-ply fin part from one end of said fin part to an opposite end thereof, said surface portions of said first zone and said surface portions of said second zone including surface portions separated from each other by substantially unsealed surface portions, and said ultrasonic heating being applied at substantially only said separated surface portions of said first zone and said separated surface portions of said second zone.

8. A method according to claim 7, and further comprising, prior to said rendering tacky of the surface portions of the first and second zones, applying abhesive to other surface portions of said second zone which are brought face-to-face with each other.

9. A method of sealing a container closure comprising a first zone not intended to be opened by a consumer of contents of the container and a second zone intended to be opened by said consumer, comprising rendering tacky by ultrasonic heating surface portions of said first zone which portions are in face-to-face contact with each other, and rendering tacky by ultrasonic heating surface-portions are in face-to-face contact with each other, said surface portions of said first zone and said surface portions of said second zone including surface portions separated from each other by substantially unsealed surface portions, and said ultrasonic heating being applied at substantially only said separated surface portions of said first zone and said separated surface portions of said second zone.

10. A container comprising a closure comprised of a first zone not intended to be opened by a consumer of contents of said container and including surface portions sealed together by a method comprising ultrasonic heating and a second zone intended to be opened by said consumer and including surface portions sealed together by a method comprising ultrasonic heating, said surface portions of said first zone and said surface portions of said second zone including surface portions separated from each other by substantially unsealed surface portions.

11. A method of sealing a carton end closure comprising a first zone not intended to be opened by a consumer of contents of the carton and a second zone intended to be opened by said consumer, the closure including a mainly four-ply sealing fin part which extends across the carton and which includes a spout part at said second zone, comprising:

rendering tacky by ultrasonic heating surface portions of said first zone which portions are in face-to-face contact with each other and which are separated by substantially unsealed surface portions;

rendering tacky by ultrasonic heating surface portions of said second zone, which latter surface portions are in face-to-face contact with each other but which constitute a lesser percentage of said second zone than the percentage of said first zone constituted by the first mentioned surface portions and which latter surface portions are separated by substantially unsealed surface portions;

wherein said steps of rendering tacky said surface portions of said first zone and of said surface portions of said second zone comprise rendering tacky a meandering band of surface portions included in said fin part and extending continuously in said four-ply fin part from one end of said fin part to an opposite end thereof; and wherein said ultrasonic heating is applied at substantially only said separated surface portions of said first zone and said separated surface portions of said second zone.

12. A carton having an end closure, said closure comprising:

a first zone not intended to be opened by a consumer of contents of said carton including surface portions sealed together by ultrasonic heating, said surface portions being separated by substantially unsealed surface portions, a second zone intended to be opened by said consumer including surface portions sealed together by ultrasonic heating, the latter surface portions constituting a lesser percentage of said second zone than the percentage of said first zone constituted by the first mentioned surface portions, said surface portions of said second zone being separated by substantially unsealed surface portions, a sealing fin formed by said first and second zones which extends from one side of said closure to an opposite side thereof and which comprises a mainly four-ply part extending from said one side to said opposite side, including a spout part at said second zone, said surface portions of said first zone and said surface portions of said second zone comprising a meandering band of surface portions included in said mainly four-ply part and extending continuously in said mainly four-ply part the length of said mainly four-ply part.

* * * * *